US012326124B2

(12) United States Patent
Tartakovsky et al.

(10) Patent No.: US 12,326,124 B2
(45) Date of Patent: Jun. 10, 2025

(54) INTERNAL COMBUSTION ENGINE WITH THERMOCHEMICAL RECUPERATION OF WASTE HEAT AND A METHOD FOR THERMOCHEMICAL RECUPERATION

(71) Applicant: Technion Research and Development Foundation Ltd., Haifa (IL)

(72) Inventors: Leonid Tartakovsky, Haifa (IL); Moshe Sheintuch, Haifa (IL); Mark Veinblat, Haifa (IL); Andy Thawko, Kfar-Kama (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 17/597,535

(22) PCT Filed: Jul. 7, 2020

(86) PCT No.: PCT/IB2020/056382
§ 371 (c)(1),
(2) Date: Jan. 10, 2022

(87) PCT Pub. No.: WO2021/005510
PCT Pub. Date: Jan. 14, 2021

(65) Prior Publication Data
US 2022/0290637 A1 Sep. 15, 2022

Related U.S. Application Data

(60) Provisional application No. 62/871,792, filed on Jul. 9, 2019.

(51) Int. Cl.
*F02M 21/02* (2006.01)
*F01N 5/02* (2006.01)
(Continued)

(52) U.S. Cl.
CPC ........... *F02M 21/0227* (2013.01); *F01N 5/02* (2013.01); *F01P 3/02* (2013.01); *F01P 3/20* (2013.01);
(Continued)

(58) Field of Classification Search
CPC ......... F01P 2003/001; F01P 3/02; F01P 3/20; F01P 5/10; F01P 7/16; F01N 5/02;
(Continued)

(56) References Cited

U.S. PATENT DOCUMENTS

2005/0279333 A1 12/2005 Kweon et al.
2008/0010993 A1 1/2008 Morgenstern
(Continued)

FOREIGN PATENT DOCUMENTS

CN 101550866 * 10/2009
DE 102015200873 * 7/2016

OTHER PUBLICATIONS

Tartakovsky, L., 2018. High-pressure thermo-chemical recuperation—a way toward sustainable propulsion systems. Procedia Manufacturing, 21, pp. 37-44. Tartakovsky, Mar. 7, 2018 (Mar. 7, 2018).

*Primary Examiner* — Phutthiwat Wongwian
*Assistant Examiner* — Diem T Tran
(74) *Attorney, Agent, or Firm* — Reches Patentss

(57) ABSTRACT

A thermochemical recuperation (TCR) system that may use a water-alcohol mixture as an engine liquid coolant; that may include a TCR reformer configured to output a TCR product at pressure no less than twenty bars; a pressure regulator; and an TCR product accumulator configured to separate an outputting of the TCR product by the TCR reformer from a provision of the TCR product to the pressure regulator; wherein the pressure regulator is configured to provide the TCR product to a direct injector of an engine, thereby enabling the direct injector to inject the TCR
(Continued)

product at a high pressure level—for example at a pressure level that exceeds twenty bars.

23 Claims, 3 Drawing Sheets

(51) Int. Cl.

| | |
|---|---|
| ***F01P 3/02*** | (2006.01) |
| ***F01P 3/20*** | (2006.01) |
| ***F01P 5/10*** | (2006.01) |
| ***F01P 7/16*** | (2006.01) |
| ***F02G 5/02*** | (2006.01) |
| *F01P 3/00* | (2006.01) |

(52) U.S. Cl.
CPC .................. *F01P 5/10* (2013.01); *F01P 7/16* (2013.01); *F02G 5/02* (2013.01); *F02M 21/0206* (2013.01); *F02M 21/0245* (2013.01); *F01P 2003/001* (2013.01)

(58) Field of Classification Search
CPC ......... F01N 5/04; F02G 5/02; F02M 21/0206; F02M 21/0227; F02M 21/0245; F02M 25/12
See application file for complete search history.

(56) References Cited

U.S. PATENT DOCUMENTS

| | | | | |
|---|---|---|---|---|
| 2011/0137537 | A1 | 6/2011 | Leone | |
| 2014/0290596 | A1 | 10/2014 | Cohn et al. | |
| 2016/0265416 | A1 * | 9/2016 | Ge | B01J 12/007 |
| 2017/0051685 | A1 * | 2/2017 | Scotto | F02M 27/02 |

* cited by examiner

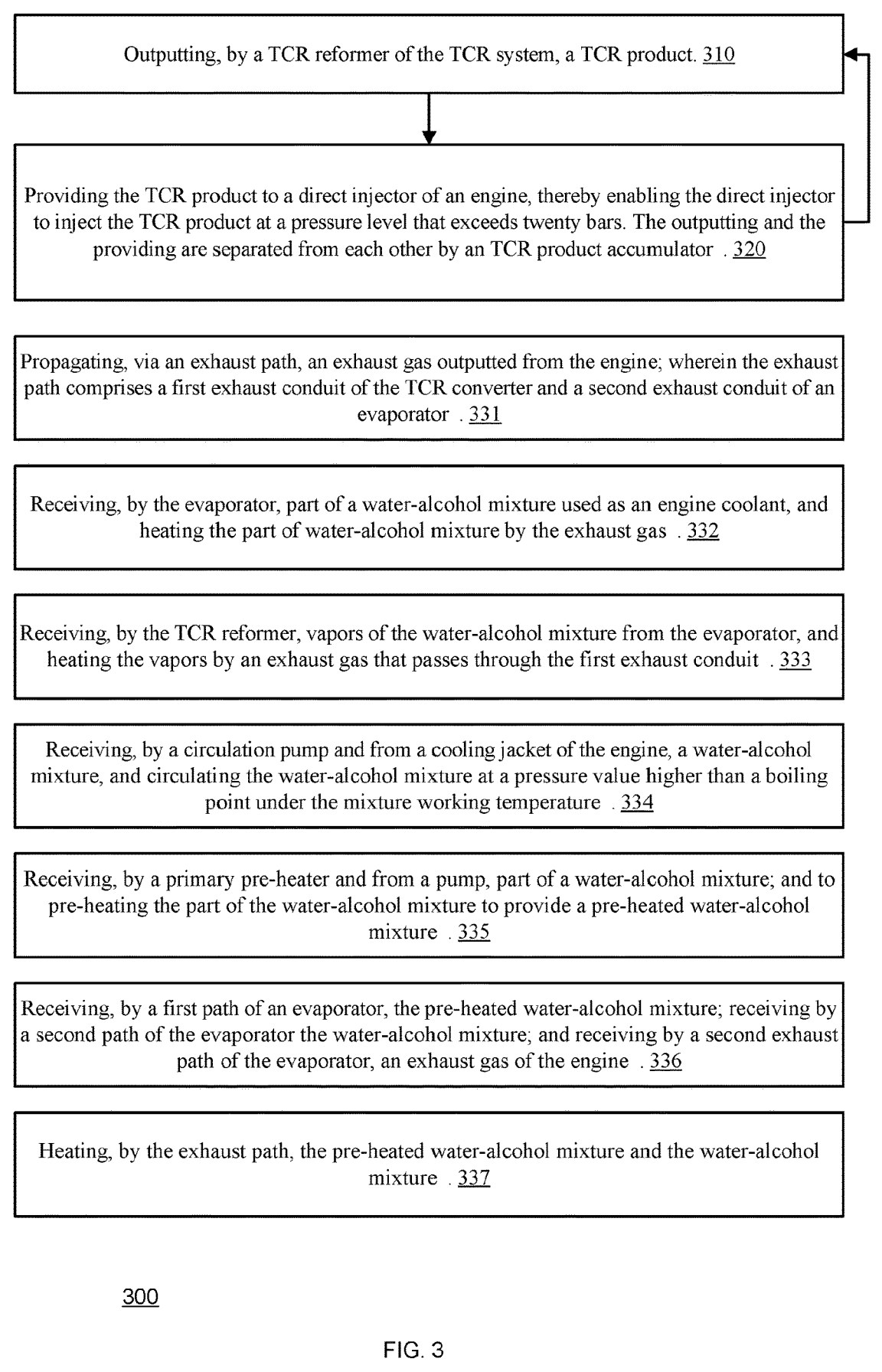

Outputting, by a TCR reformer of the TCR system, a TCR product. 310

Providing the TCR product to a direct injector of an engine, thereby enabling the direct injector to inject the TCR product at a pressure level that exceeds twenty bars. The outputting and the providing are separated from each other by an TCR product accumulator . 320

Propagating, via an exhaust path, an exhaust gas outputted from the engine; wherein the exhaust path comprises a first exhaust conduit of the TCR converter and a second exhaust conduit of an evaporator . 331

Receiving, by the evaporator, part of a water-alcohol mixture used as an engine coolant, and heating the part of water-alcohol mixture by the exhaust gas . 332

Receiving, by the TCR reformer, vapors of the water-alcohol mixture from the evaporator, and heating the vapors by an exhaust gas that passes through the first exhaust conduit . 333

Receiving, by a circulation pump and from a cooling jacket of the engine, a water-alcohol mixture, and circulating the water-alcohol mixture at a pressure value higher than a boiling point under the mixture working temperature . 334

Receiving, by a primary pre-heater and from a pump, part of a water-alcohol mixture; and to pre-heating the part of the water-alcohol mixture to provide a pre-heated water-alcohol mixture . 335

Receiving, by a first path of an evaporator, the pre-heated water-alcohol mixture; receiving by a second path of the evaporator the water-alcohol mixture; and receiving by a second exhaust path of the evaporator, an exhaust gas of the engine . 336

Heating, by the exhaust path, the pre-heated water-alcohol mixture and the water-alcohol mixture . 337

300

FIG. 3

INTERNAL COMBUSTION ENGINE WITH THERMOCHEMICAL RECUPERATION OF WASTE HEAT AND A METHOD FOR THERMOCHEMICAL RECUPERATION

CROSS REFERENCE

This application claims priority from U.S. provisional patent Ser. No. 62/871,792 filing date Jul. 9, 2019 which is incorporated herein by reference.

BACKGROUND

Internal combustion engine (ICE) is expected to remain the main propulsion technology for the next decades in various applications.

ICE has few drawbacks. These drawbacks may include the security of energy supply, climate change issues and air pollution.

Given these drawbacks there is a need in replacement of fossil fuels by low carbon intensity non-fossil ones, substantial improvement of the ICE efficiency and mitigation of pollutant emissions related to ICEs.

One improvement involves using an on-board thermochemical recuperation (TCR) of non-fossil derived alcohols (ethanol, methanol etc.) that utilizes the thermal energy of ICE exhaust gases to sustain endothermic reactions of fuel reforming. This technology allows feeding the ICE by hydrogen-rich gaseous fuel thereby increasing engine efficiency and reducing pollutant emissions. The TCR technology may be combined with an engine turbo/supercharging, widely used nowadays.

A known solution involves having an ICE with TCR that use a low-pressure (up to 7 bar) port injection of the reforming products (gaseous hydrogen-rich fuel) into the engine intake manifold.

This known solution suffers from the following drawbacks:

a. ICE exhibits start-up and low-load operation problems, because thermal energy of exhaust gases is not sufficient to activate the TCR system at start-up and low-load operation of the ICE;
b. The ICE exhibits maximal power loss due to intake air partial replacement by the hydrogen-rich gaseous reformate injected into the intake manifold.
c. The ICE suffers from pre-ignition events.
d. The ICE is susceptible to backfire danger.
e. The ICE transient operating (quick rise of engine load or speed) is of low quality.
f. Stratified charge operation is not feasible.

There is a growing need to provide an improved system and method of waste heat recuperation that involve an ICE with TCR.

SUMMARY OF THE INVENTION

There may be provided systems and method as substantially illustrated in the drawings and/or the specification.

There may be provided a thermochemical recuperation (TCR) system, may include a TCR reformer configured to output a TCR product; a pressure regulator; an TCR product accumulator configured to separate an outputting of the TCR product by the TCR reformer from a provision of the TCR product to the pressure regulator; and wherein the pressure regulator may be configured to provide the TCR product to a direct injector of an engine, thereby enabling the direct injector to inject the TCR product at high pressure levels— for example pressure level that may even exceed twenty bars. The high pressure levels may be lower than twenty bars.

The TCR product accumulator may be an aggregating vessel.

The TCR product accumulator may include a heat exchanger.

The TCR system may include an evaporator that may be fluidly coupled to the TCR reformer, the TCR reformer may include a first exhaust gas conduit, the evaporator may include a second exhaust gas conduit, wherein the first exhaust conduit may be fluidly coupled between an exhaust output of the engine and the second exhaust conduit.

The evaporator may be configured to receive a water-alcohol mixture used as an engine coolant, and to heat the water-alcohol mixture by an exhaust gas that passes through the second exhaust conduit.

The TCR reformer may be configured to receive vapors of the water-alcohol mixture from the evaporator, and to heat the vapors by an exhaust gas that passes through the first exhaust conduit.

The TCR system may include a circulation pump that may be configured to receive from a cooling jacket of the engine, a water-alcohol mixture, and to circulate the water-alcohol mixture at high pressure.

The TCR system may include a primary pre-heater that may be configured to receive, from a pump, a water-alcohol mixture and to pre-heat the water-alcohol mixture to provide a pre-heated water-alcohol mixture.

The TCR system may include an evaporator that may be fluidly coupled to the TCR reformer, wherein the evaporator may include a first path that may be configured to receive the pre-heated water-alcohol mixture, a second path that may be configured to receive the water-alcohol mixture, and second exhaust gas conduit.

The second exhaust gas conduit may be thermally coupled to the first path and the second path, wherein the second exhaust gas conduit may be configured to receive an exhaust gas thereby heating the pre-heated water-alcohol mixture and the water-alcohol mixture.

The TCR system may include the engine.

The TCR system further may include (a) a coolant circulation pump, (b) a coolant radiator having an output that may be fluidly coupled to an input of a cooling jacket of the engine, (c) a coolant thermostat that may be fluidly coupled between the coolant circulation pump and the coolant radiator, (d) an evaporator, (e) a pump having an input that may be fluidly coupled to an output of the coolant circulation pump and an output that may be fluidly coupled to an input of the evaporator, (f) the TCR reformer, and (g) a liquid phase drainage having an input that may be fluidly coupled to an output of the TCR reformer and an output that may be fluidly coupled to an input of the pump.

The TCR system further may include (a) a primary pre-heater, (b) a coolant circulation pump, (c) a coolant radiator having an output that may be fluidly coupled to an input of a cooling jacket of the engine, (d) a coolant thermostat that may be fluidly coupled between the coolant circulation pump and the coolant radiator, (e) an evaporator that may include a first path and a second path, wherein the second path may be fluidly coupled to an output of the primary pre-heater, (f) a pump having an input that may be fluidly coupled to an output of a tank and an output that may be fluidly coupled to the first path of the evaporator, (g) the TCR reformer, and (h) a liquid phase drainage having an input that may be fluidly coupled to an output of the TCR reformer and an output that may be fluidly coupled to an input of the pump.

The TCR system further may include a controller that may be configured to control a flow rate of the water-alcohol mixture depending on an operation regime of the engine.

There may be provided a method for operating a thermochemical recuperation (TCR) system, the method may include outputting, by a TCR reformer of the TCR system, a TCR product; and providing the TCR product to a direct injector of an engine, thereby enabling the direct injector to inject the TCR product at high pressure levels—for example pressure level that may even exceed twenty bars. The high pressure levels may be lower than twenty bars. The outputting and providing may be separated from each other by a TCR product accumulator of TCR system.

The method may include propagating, via an exhaust path, an exhaust gas outputted from the engine; wherein the exhaust path may include a first exhaust conduit of the TCR converter and a second exhaust conduit of an evaporator.

The method may include receiving, by the evaporator, a water-alcohol mixture used as an engine coolant, and heating the water-alcohol mixture by the exhaust gas.

The method may include receiving, by the TCR reformer, vapors of the water-alcohol mixture from the evaporator, and heating the vapors by an exhaust gas that passes through the first exhaust conduit.

The method may include receiving, by a circulation pump and from a cooling jacket of the engine, a water-alcohol mixture, and circulating the water-alcohol mixture at high pressure.

The method may include receiving, by a primary preheater and from a pump, a water-alcohol mixture; and to pre-heating the water-alcohol mixture to provide a pre-heated water-alcohol mixture.

The method may include receiving, by a first path of an evaporator, the pre-heated water-alcohol mixture; receiving by a second path of the evaporator the non-preheated water-alcohol mixture; dividing the evaporator onto two cameras; and location of each path in its own camera.

The method may include receiving primarily exhaust gas of high thermal energy by the evaporator camera that contains the path of preheated mixture and then receiving exhaust gas of residual thermal energy by the evaporator camera that contains the path of non-preheated mixture.

The method may include heating and evaporating, by the exhaust path, the pre-heated water-alcohol mixture and the non-preheated water-alcohol mixture.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates an example of a method.

DETAILED DESCRIPTION OF EMBODIMENTS

Figure 1:
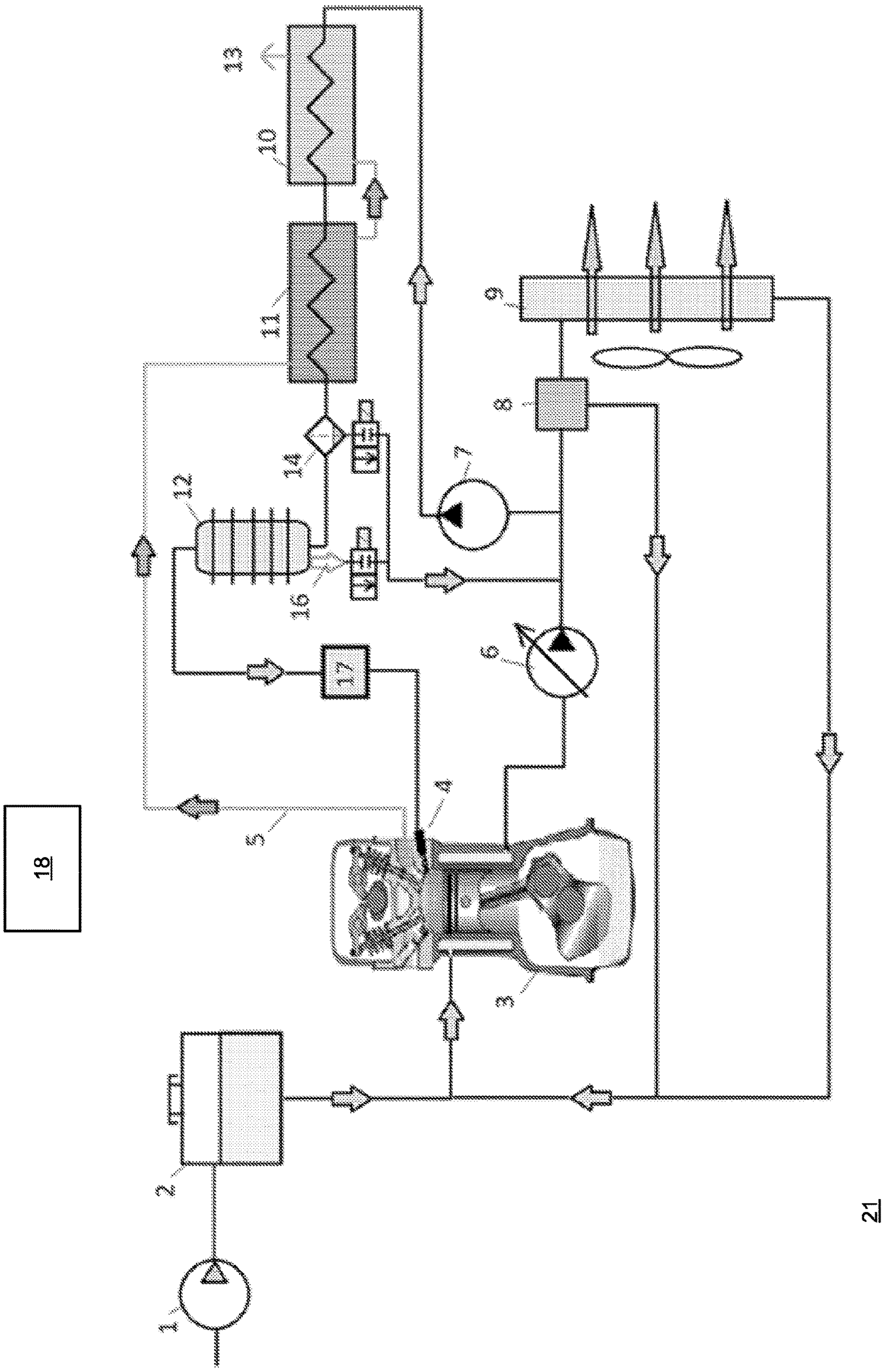
FIG. 1 illustrates an example of a system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

The terms "engine" and ICE are used in an interchangeable manner.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The system may be a vehicle, may be included in a vehicle, may include an ICE, may be provided in addition to the ICE, may be assembled to be coupled to the ICE, and the like.

There may be provided a system that may be configured to directly inject TCR products under a pressure of no less than 20 bar into an engine cylinder. This avoids an engine power loss, a backfire, pre-ignition, and ensures the charge stratification possibility. There may be provided a method for operating said system.

There may be provided a system that may be configured to circulate a primary (water-alcohol mixture) and gaseous products of the reforming is carried-out by a high-pressure pump. This decreases substantially a mechanical energy withdrawn from the engine, but may limit a range of operating modes in which the reformer is active. For example, at idle and low-load modes the available thermal energy of exhaust gas could be not sufficient for highly pressurized fuel evaporation and subsequent reforming. There may be provided a method for operating said system.

There may be provided a system in which a gaseous fuel production and injection/consumption processes are non-synchronized. For example—an injection line is separated from the reformate production system by a fuel accumulation high-pressure vessel (accumulator) designed as a heat exchanger. This vessel may ensure the engine feeding under cold start-up, idle and low-load regimes. This may also improve a quality of transient operation (quick rise of engine load or speed) when the reformer cannot produce a required quantity of the reformate fuel due to its thermal inertia. There may be provided a method for operating said system.

In said system, during middle and high-load regimes, the reformer may be configured to produce the reformate at the required quantity or more than the instantaneous fuel consumption, whereas the excess reformate may be accumulated and stored in the vessel. This vessel may be also configured to function as a water separator and heat exchanger, where the produced reformate is cooled, and, simultaneously, the liquid primary fuel is preheated.

There may be provided a system with high-pressure thermochemical recuperation where the primary fuel (water-alcohol mixture) is used as the engine coolant thus ensuring additional waste heat recovery through primary fuel preheating by the waste heat rejected by the engine cooling system. There may be provided a method for operating said system.

There may be provided a system in which the engine coolant circulation pump may be a computerized controlled variable speed device that may ensure maximal possible engine-out coolant temperature at entire range of the engine operating modes. There may be provided a method for operating said system.

There may be provided a system that may be configured to vary the primary fuel flow rates through the preheater by the engine coolant and by the hot reformate. The variation may be controlled by a computerized controller based on one or more parameters such as an engine operating mode. The control may ensure a fulfillment of one or more criteria—such as a maximal waste heat recovery and/or best possible energy efficiency at each regime. Sub-optimal energy efficiency and/or waster heat recovery may also be provided. There may be provided a method for operating said system.

Figure 2:
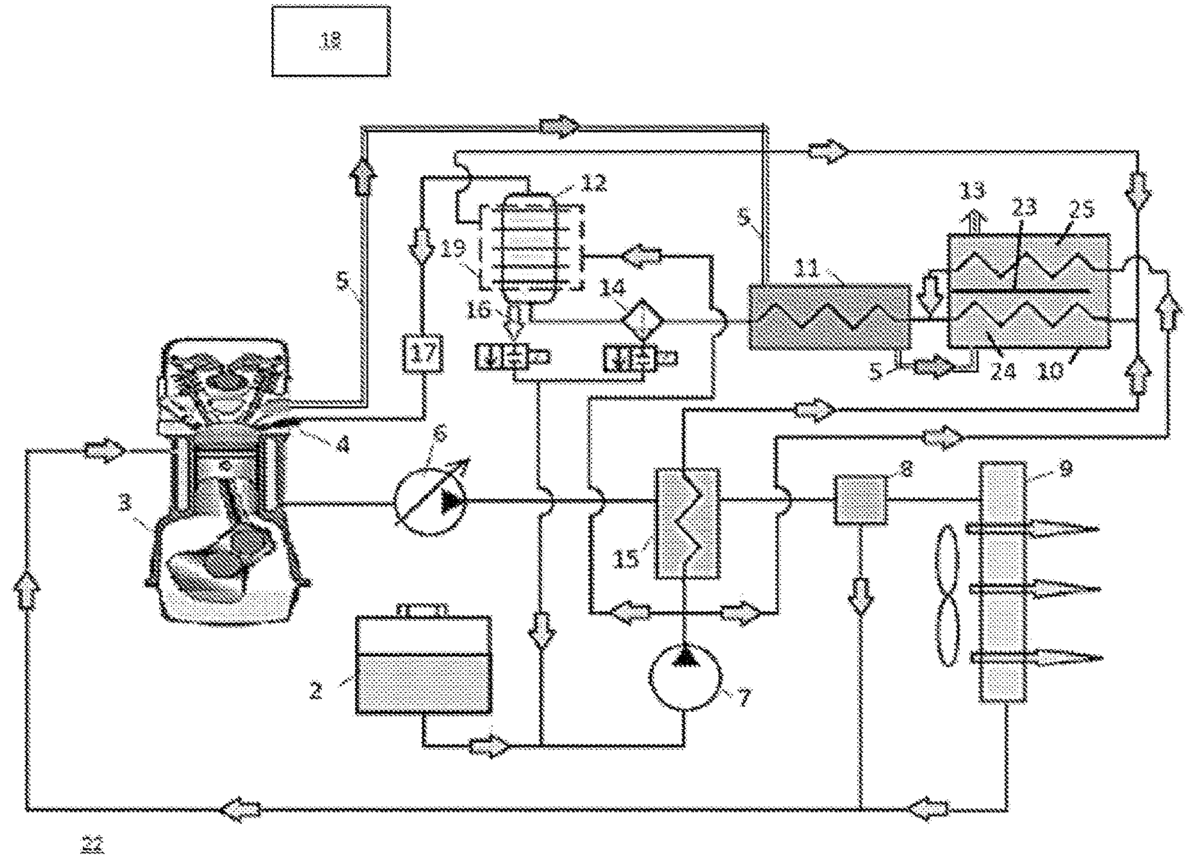
FIG. 2 illustrates an example of a system.

FIGS. 1 and 2 illustrate examples of a system.

System 21 of FIG. 1 includes compressor 1, supply/expansion tank 2, engine 3, direct injector 4, exhaust line 5, coolant circulation pump 6, pump 7, coolant thermostat 8, coolant radiator 9, evaporator 10, TCR reformer 11, pressurized reforming product vessel 12, exhaust line tailpipe 13, liquid phase separator 14, liquid phase drainage 16, pressure regulator 17 and controller 18. Controller 18 may or may not belong to system 21.

An output of compressor 1 is fluidly coupled to an input of supply/expansion tank 2.

An output of supply/expansion tank 2, an output of coolant thermostat 8, and an output of coolant radiator 9 are fluidly coupled to an input of a cooling jacket of engine 3.

An output of the cooling jacket of engine 3 is fluidly coupled to an input of coolant circulation pump 6.

An output of coolant circulation pump 6, an output of liquid phase drainage 14, and an output of liquid water drainage 16 are fluidly coupled to an input of pump 7 and to an input of coolant thermostat 8.

An output of pump 7 is fluidly coupled to an input of evaporator 10.

An output of evaporator 10 is fluidly coupled to an input of TCR reformer 11.

An output of the TCR reformer 11 is fluidly coupled to input of liquid phase separator 14.

An exhaust path is provided by the exhaust line 5, an exhaust gas conduit formed in the TCR reformer 11, an exhaust gas conduit that fluidly couples an exit of the TCR reformer conduit to an exhaust gas conduit formed in evaporator 10. The exhaust gas conduit formed in evaporator 10 has an outlet 13 from which the exhaust gas exits to environments.

The exhaust gases heat the fluids that flow in the evaporator 10 and the TCR reformer 11.

An output of the TCR reformer 11 is fluidly coupled to an input of liquid phase drainage 14 and then—to pressurized reforming product vessel 12.

An output of pressurized reforming product vessel 12 is fluidly coupled to an input of pressure regulator 17. An output of pressure regulator 17 is fluidly coupled to an input of direct injector 4 of engine 3.

System 21 uses a water-alcohol mixture as an engine coolant. In the following text that concerns FIG. 1 the terms coolant and mixture are used in an interchangeable manner.

Since the mixture has lower values of boiling temperature and heat capacity in comparison to traditional coolants, air compressor 1 pressurizes the mixture in supply/expansion tank 2 and in the entire coolant circulation system. The pressure may also compensate a vacuum creation in the supply/expansion tank 2.

Coolant circulation pump 6 is of a variable pumping speed and may pump the mixture at a speed that may ensure coolant circulation in the cooling jacket of engine 3.

The flow rate of the mixture may be controlled by a computerized controller 18—for example depending on the engine operation regime and allows maintaining the outlet temperature of the mixture as high as possible under wide range of the engine operation modes. The coolant thermostat 8 and radiator unit 9 may be like those currently used in ICEs. A definite part of the coolant (defined by the fuel consumption of the engine 3), is directed to the inlet of pump 7. Pump 7 rises the pressure of the mixture up to working values of the TCR reformer 11 (no less than 20 bar). Before entering the TCR reformer 11, the mixture (which is preheated by engine 3) passes through the evaporator 10 where liquid-to-vapor phase transition takes place. The TCR reformer 11 and the evaporator 10 are heated by exhaust gases that flow through exhaust line 5 from engine 3.

The exhaust gases pass primarily through the TCR reformer 11 and then through the evaporator 10. Due to elevated pressure in the system, realization of the evaporation process may require a higher temperature of the exhaust gases compared to atmospheric conditions, i.e. the range of the operating regimes of engine 3, where the evaporator 10 and the TCR reformer 11 are activated, may be limited by middle and high engine loads. This means that under cold start and low loads the TCR reformer 11 may not produce the reformate required for the operation of engine 3.

This drawback is solved by presence the pressurized reforming product vessel 12.

The pressurized reforming product vessel 12 may be a finned accumulating vessel 12. Under the middle and high loads of engine 3, the reforming system produces the reformate in a quantity exceeding the instantaneous fuel consumption of engine 3. The excess of the fuel is accumulated and stored in the pressurized reforming product vessel 12, and is used during cold start and low-load regimes. At the same time, the pressurized reforming product vessel 12 may be used as the reformate cooler and a condensed liquid phase separator 16.

A pressure regulator 17 may be located at the exit of the pressurized reforming product vessel 12. The pressure regulator 17 may be configured to maintain an optimal fuel pressure at the inlet of the direct injector 4 of engine 3. This optimal fuel pressure may be electronically controlled by the computerized controller—for example depending on the engine operation mode. The pressurized reforming product vessel 12 may resolves the engine transient (quick rise of engine load or speed) operation problem as well, when a short-time rise in the injected fuel quantity is required, but the TCR reformer 11 itself cannot ensure this due to its high thermal inertia. A liquid phase drainage 14 fluidly coupled to an exit of the TCR reformer 11 may be configured to decrease the nonreformed water-alcohol liquid phase penetration into the direct injector 4 of engine 3.

The system may be equipped by set of sensors, actuators and control elements to ensure functioning of the entire system in terms of energy efficiency and emissions mitigation.

FIG. 2 is an example of system 22. In system 22 a traditional coolant is used for cooling engine 3.

Contrary to system 22, in system 21 a sufficient mixture preheating takes place in the engine cooling jacket, such as there is no possibility of an additional preheating.

In system 22, the primary fuel preheating is partly realized in the heat exchanger 15 located at the coolant outlet from the cooling jacket of the engine 3. In parallel, another part of the cool primary fuel is directed into heat exchanger 19 that designed as a component of vessel 12 where the cool primary fuel preheating by thermal energy of the hot reformate takes place. At the same time, cooling of the hot reformate occurs inside the pressurized reforming product vessel. The input of the heat exchanger is coupled to an exit of pump 7. The output of the heat exchanger is coupled to the first path of the evaporator 10

System 22 of FIG. 2 includes supply tank 2, engine 3, direct injector 4, exhaust line 5, coolant circulation pump 6, liquid fuel mixture pump 7, coolant thermostat 8, coolant radiator 9, evaporator 10, TCR reformer 11, pressurized reforming product vessel 12 designed as heat exchanger 19, exhaust line tailpipe 13, liquid phase drainage 14, primary fuel preheater 15, liquid water drainage 16, pressure regulator 17 and controller 18. Controller 18 may or may not belong to system 22.

An output of supply tank 2, output of liquid phase drainage 14, and an output of liquid water drainage 16 are fluidly coupled to an input of pump 7.

An output of pump 7 is fluidly coupled to the input of heat exchanger 19 that is part of pressurized reforming product vessel 12, to an input of primary fuel preheater 15 and to a first input of evaporator 10.

An output of heat exchanger of pressurized reforming product vessel 12 and an output of primary fuel preheater 15 are fluidly coupled to first input of evaporator 10. The first input of evaporator 10 received preheated fuel. Small part of non-preheated fuel is supplied from pump 7 to a second input of evaporator 10, in order to ensure maximal utilization of the exhaust gas thermal energy.

An exhaust path is provided by the exhaust line 5, an exhaust gases conduit formed in the TCR reformer 11, and an exhaust gases conduit formed in evaporator 10.

The exhaust gas conduit in evaporator 10 is formed of two cameras 23 and 24 separated from each other by partition 25. The exhaust gases of high thermal energy enter primarily into the camera 23 where the preheated mixture heat exchanger is located; the exhaust gases of residual thermal energy enter into camera 24 where the non-preheated mixture heat exchanger is located. Camera 24 has an outlet 13 from which the exhaust gases exit into environments. The exhaust path heats the fluids that flow in the TCR reformer 11 and the evaporator 10.

The preheated liquid water-alcohol mixture flows from the first input of evaporator 10 through a first path and exits through a first output of the evaporator 10. While propagating along the first path the preheated liquid water-alcohol mixture is heated by the exhaust gases. As a result of this, an evaporation of the liquid water-alcohol mixture takes place.

Only small part of the water-alcohol mixture flows through the non-preheated path to utilize a low thermal energy of the exhaust gas that remains after the preheated mixture mainstream heating. The non-preheated path has to be located at the exit side of the evaporator exhaust gas conduit.

The non-preheated liquid water-alcohol mixture flows from the second input of evaporator 10 to a second output of evaporator 10 through a second path (that differs from the first path) and exits through a second output of the evaporator 10. While propagating along the second path the non-preheated fuel is also heated by the exhaust gases.

The second output and the first output of the evaporator are fluidly coupled to a first input of TCR reformer 11.

An output of coolant thermostat 8, and an output of coolant radiator 9 are fluidly coupled to an input of a cooling jacket of engine 3.

An output of the cooling jacket of engine 3 is fluidly coupled to an input of coolant circulation pump 6.

An output of coolant circulation pump 6 is fluidly coupled to an input of preheater 15 and then—to an input of coolant thermostat 8.

An output of TCR reformer 11 is fluidly coupled to an input of liquid phase separator 14; the latter has two outputs: an output of gaseous products of reforming is fluidly coupled to the pressurized reforming product vessel 12 and another output for a condensed liquid phase is fluidly coupled to an input of the pump 7.

Pressurized reforming product vessel 12 has two outputs: one of them for gaseous reforming products is fluidly coupled to an input of pressure regulator 17 and another one for a condensed liquid phase is fluidly coupled to an input of liquid phase separator 16. An output of pressure regulator 17 is fluidly coupled to an input of direct injector 4 of engine 3; an output of separator 16 is fluidly coupled to an input of pump 7.

The TCR reformer 11 and the evaporator 10 are heated by exhaust gases that flow through exhaust line 5 from engine 3. The exhaust gases flow primarily through the gas conduit of the TCR reformer 11 and then through the gas conduit of the evaporator 10.

There may be provided a method for operating a system illustrated in FIG. 1.

There may be provided a method for operating a system illustrated in FIG. 2.

FIG. 3 illustrates method 300.

Method 300 may be for operating a thermochemical recuperation (TCR) system.

Method 300 may include step 310 of outputting, by a TCR reformer of the TCR system, a TCR product. Step 310 may be followed by step 320 of providing the TCR product to a direct injector of an engine, thereby enabling the direct injector to inject the TCR product at high pressure levels—for example pressure level that may even exceed twenty bars. The high pressure levels may be lower than twenty bars.

Steps 310 and 320 are separated from each other by an TCR product accumulator.

The TCR product accumulator may be an aggregating vessel.

The TCR product accumulator may include a heat exchanger.

Method 300 may include at least one of the following steps:

a. Step 331 of propagating, via an exhaust path, an exhaust gas outputted from the engine; wherein the exhaust path comprises a first exhaust conduit of the TCR converter and a second exhaust conduit of an evaporator.

b. Step 332 of receiving, by the evaporator, part of a water-alcohol mixture used as an engine coolant, and heating the part of water-alcohol mixture by the exhaust gas.

c. Step 333 of receiving, by the TCR reformer, vapors of the water-alcohol mixture from the evaporator, and heating the vapors by an exhaust gas that passes through the first exhaust conduit.

d. Step 334 of receiving, by a circulation pump and from a cooling jacket of the engine, a water-alcohol mixture, and circulating the water-alcohol mixture at a pressure value higher than a boiling point under the mixture working temperature.

e. Step 335 of receiving, by a primary pre-heater and from a pump, part of a water-alcohol mixture; and to pre-heating the part of the water-alcohol mixture to provide a pre-heated water-alcohol mixture.

f. Step 336 of receiving, by a first path of an evaporator, the pre-heated water-alcohol mixture; receiving by a second path of the evaporator the water-alcohol mixture; and receiving by a second exhaust path of the evaporator, an exhaust gas of the engine.

g. Step 337 of heating, by the exhaust path, the pre-heated water-alcohol mixture and the water-alcohol mixture.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A thermochemical recuperation (TCR) system, comprising:

a TCR reformer configured to output a TCR product;

a pressure regulator;

a TCR product accumulator configured to separate an outputting of the TCR product by the TCR reformer from a provision of the TCR product to the pressure regulator; and a primary pre-heater that is configured to receive, from a coolant circulation pump, a water-alcohol mixture and to pre-heat the water-alcohol mixture to provide a pre-heated water-alcohol mixture;

wherein the pressure regulator is configured to provide the TCR product to a direct injector of an engine, thereby enabling the direct injector to inject the TCR product at a high pressure level.

2. The TCR system according to claim 1 wherein the TCR product accumulator is an aggregating vessel.

3. The TCR system according to claim 1 wherein the TCR product accumulator comprises a heat exchanger.

4. The TCR system according to claim 1 comprising an evaporator that is fluidly coupled to the TCR reformer, the TCR reformer comprises a first exhaust gas conduit, the evaporator comprises a second exhaust gas conduit, wherein the first exhaust gas conduit is fluidly coupled between an exhaust output of the engine and the second exhaust gas conduit.

5. The TCR system according to claim 4 wherein the evaporator is configured to be heated by an exhaust gas that passes through the second exhaust conduit.

6. The TCR system according to claim 5 wherein the TCR reformer is configured to receive vapors of the water-alcohol mixture from the evaporator, and to heat the vapors by an exhaust gas that passes through the first exhaust conduit.

7. The TCR system according to claim 1 comprising the coolant circulation pump that is configured to receive, from a cooling jacket of the engine, the water-alcohol mixture, and to circulate the water-alcohol mixture at a pressure value higher than a boiling point under a water-alcohol mixture working temperature.

8. The TCR system according to claim 1, comprising an evaporator that is fluidly coupled to the TCR reformer, wherein the evaporator comprises a first path that is configured to receive the pre-heated water-alcohol mixture, a second path that is configured to receive the water-alcohol mixture from a cooling jacket of the engine, and a second exhaust gas conduit.

9. The TCR system according to claim 8 wherein the second exhaust gas conduit is thermally coupled to the first path and the second path, wherein the second exhaust gas conduit is configured to receive an exhaust gas thereby heating the pre-heated water-alcohol mixture and the water-alcohol mixture.

10. The TCR system according to claim 9 wherein the first path receives primarily exhaust gases of high thermal energy and the second path receives exhaust gases of residual thermal energy.

11. The TCR system according to claim 1 comprising the engine.

12. The TCR system according to claim 1 further comprising a coolant radiator having an output that is fluidly coupled to an input of a cooling jacket of the engine, a coolant thermostat that is fluidly coupled between the coolant circulation pump and the coolant radiator, an evaporator, a pump having an input that is fluidly coupled to an output of the coolant circulation pump and an output that is fluidly coupled to an input of the evaporator, the TCR reformer, and a liquid phase drainage having an input that is fluidly coupled to an output of the TCR reformer and an output that is fluidly coupled to an input of the pump.

13. The TCR system according to claim 1 further comprising a coolant radiator having an output that is fluidly coupled to an input of a cooling jacket of the engine, a coolant thermostat that is fluidly coupled between the coolant circulation pump and the coolant radiator, an evaporator that comprises a first path and a second path, wherein the second path is fluidly coupled to an output of the primary pre-heater, a pump having an input that is fluidly coupled to an output of a tank and an output that is fluidly coupled to the primary preheater, its outlet is fluidly coupled to the first path of the evaporator, the TCR reformer, and a liquid phase drainage having an input that is fluidly coupled to an output of the TCR reformer and an output that is fluidly coupled to an input of the pump.

14. The TCR system according to claim 1 further comprising a controller that is configured to control a flow rate of the water-alcohol mixture depending on an operation regime of the engine.

15. The TCR system according to claim 1, wherein the high pressure level exceeds twenty bars.

16. A thermochemical recuperation (TCR) system, comprising:

a TCR reformer configured to output a TCR product;

a pressure regulator;

a TCR product accumulator configured to separate an outputting of the TCR product by the TCR reformer from a provision of the TCR product to the pressure regulator; and a circulation pump that is configured to receive a water-alcohol mixture from a cooling jacket of the engine, and to circulate the water-alcohol mixture at a pressure value higher than a boiling point under a water-alcohol mixture working temperature;

wherein the pressure regulator is configured to provide the TCR product to a direct injector of an engine, thereby enabling the direct injector to inject the TCR product at a high pressure level.

17. The TCR system according to claim 16, comprising an evaporator that is fluidly coupled to the TCR reformer, wherein the evaporator comprises a first path that is configured to receive a pre-heated water-alcohol mixture from a primary pre-heater, and a second path that is configured to receive the water-alcohol mixture from the cooling jacket of the engine, and a second exhaust gas conduit.

18. The TCR system according to claim 17 wherein the second exhaust gas conduit is thermally coupled to the first path and the second path, wherein the second exhaust gas conduit is configured to receive an exhaust gas thereby heating the pre-heated water-alcohol mixture and the water-alcohol mixture.

19. The TCR system according to claim 18 wherein the first path receives primarily exhaust gases of high thermal energy and the second path receives exhaust gases of residual thermal energy.

20. The TCR system according to claim 16, wherein the high pressure level exceeds twenty bars.

21. A thermochemical recuperation (TCR) system, comprising:

a TCR reformer configured to output a TCR product;

a pressure regulator;

a TCR product accumulator configured to separate an outputting of the TCR product by the TCR reformer from a provision of the TCR product to the pressure regulator;

a coolant circulation pump;

a coolant radiator having an output that is fluidly coupled to an input of a cooling jacket of the engine;

a coolant thermostat that is fluidly coupled between the coolant circulation pump and the coolant radiator;

an evaporator;

a pump having an input that is fluidly coupled to an output of the coolant circulation pump and an output that is fluidly coupled to an input of the evaporator, the TCR reformer; and a liquid phase drainage having an input that is fluidly coupled to an output of the TCR reformer and an output that is fluidly coupled to an input of the pump;

wherein the pressure regulator is configured to provide the TCR product to a direct injector of an engine, thereby enabling the direct injector to inject the TCR product at a high pressure level.

22. The TCR system according to claim 21, further comprising a primary pre-heater that is configured to receive, from the coolant circulation pump, a water-alcohol mixture and to pre-heat the water-alcohol mixture to provide a pre-heated water-alcohol mixture.

23. The TCR system according to claim 21, wherein the high pressure level exceeds twenty bars.

* * * * *